United States Patent
Endo et al.

(10) Patent No.: US 6,969,838 B2
(45) Date of Patent: Nov. 29, 2005

(54) IMAGE SENSOR

(75) Inventors: Takafumi Endo, Tokyo (JP); Yohei Nokami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/933,224

(22) Filed: Sep. 3, 2004

(65) Prior Publication Data

US 2005/0218294 A1 Oct. 6, 2005

(30) Foreign Application Priority Data

Mar. 31, 2004 (JP) ............................. 2004-105681

(51) Int. Cl.[7] ............................................. H01L 27/00
(52) U.S. Cl. .................... 250/208.1; 358/482; 358/513
(58) Field of Search .................... 250/208.1; 358/482, 358/483, 513, 514

(56) References Cited

U.S. PATENT DOCUMENTS

| 5,489,992 A | | 2/1996 | Endo |
| 5,619,345 A | * | 4/1997 | Machida et al. ............. 358/482 |
| 6,486,979 B1 | * | 11/2002 | Sawada ...................... 358/483 |
| 6,865,000 B2 | * | 3/2005 | Yushiya ...................... 358/518 |

FOREIGN PATENT DOCUMENTS

| JP | 06-218985 | 8/1994 |
| JP | 2003-101724 | 4/2003 |

* cited by examiner

Primary Examiner—Kevin Pyo
(74) Attorney, Agent, or Firm—Oblon, Spivak, McClelland, Maier & Neustadt, P.C.

(57) ABSTRACT

An image sensor includes: a sensor substrate on that a large number of semiconductor chips each of which has a plurality of image pickup elements, are linearly arranged to receive the reflected light converged by the lens; and a transparent plate that is interposed between the lens and the sensor substrate, and provides a light path region corresponding to the boundary region between adjacent semiconductor chips with a refractive function, so that the vertical light incident on the boundary region between semiconductor chips 6 is refracted and incident dividedly to the directions of respective image pickup elements.

5 Claims, 10 Drawing Sheets

FIG.1 LIGHT PATH AXIS
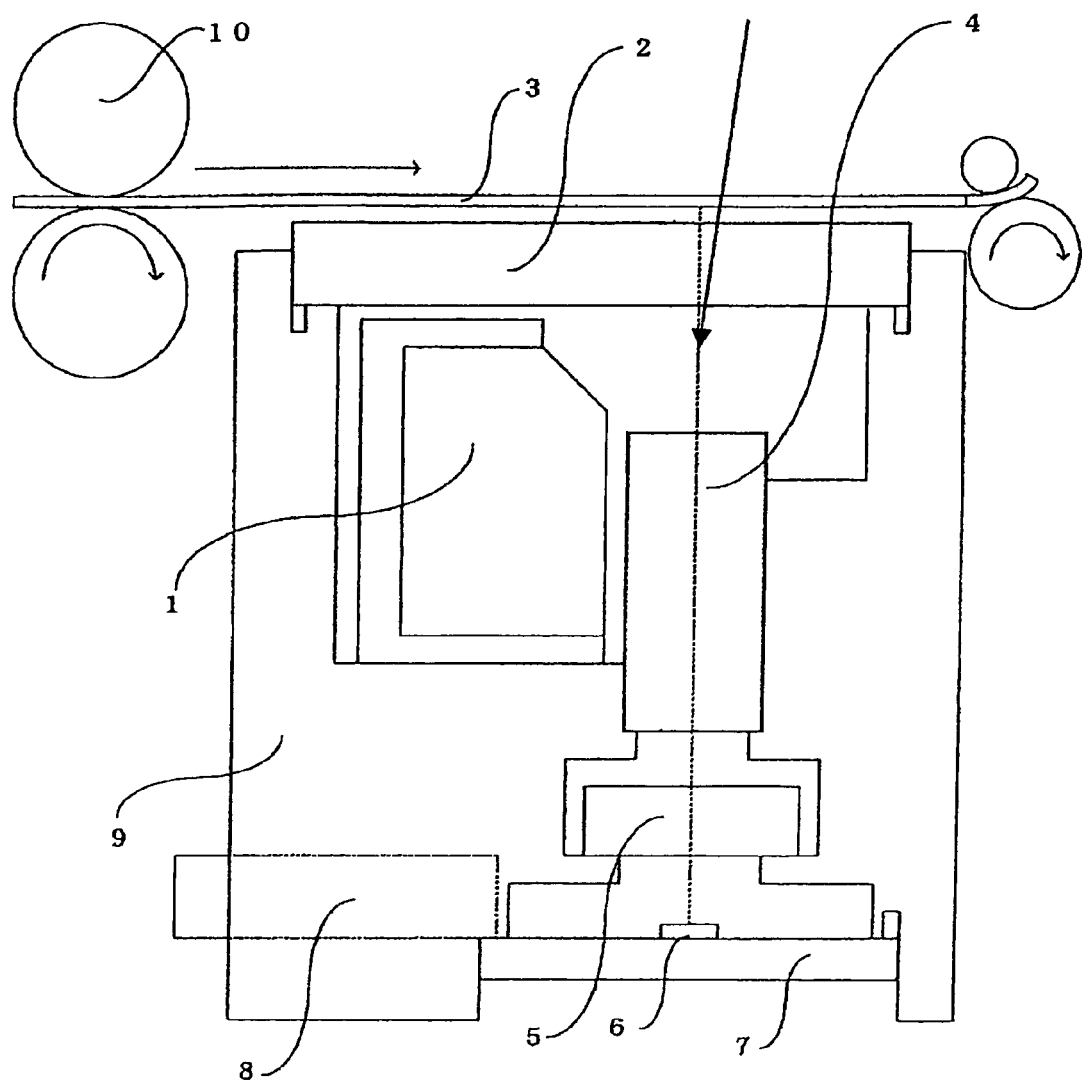
FIG.2
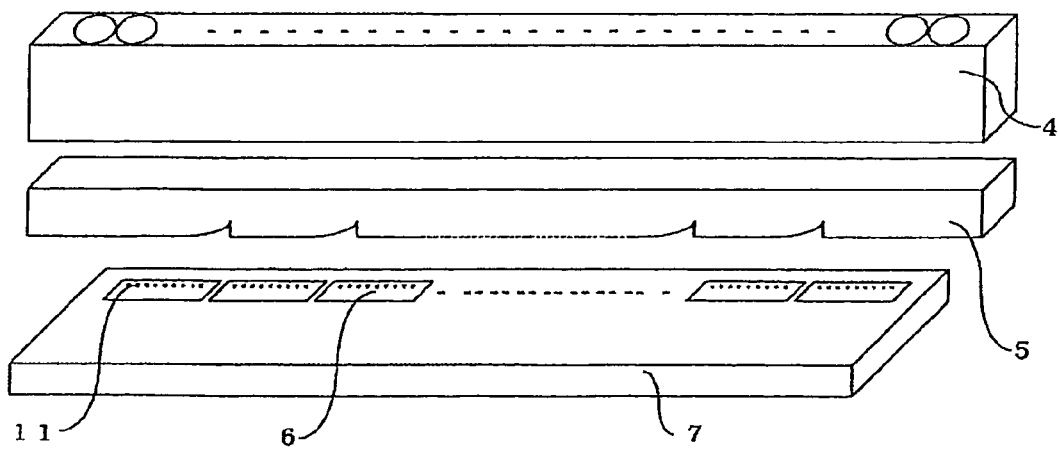

FIG.6
A&B PORTIONS CROSS SECTION
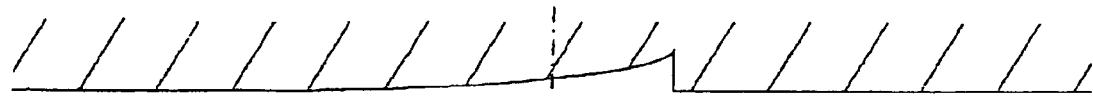
C&D PORTIONS CROSS SECTION
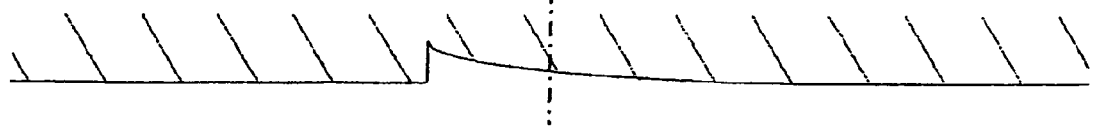
FIG.7
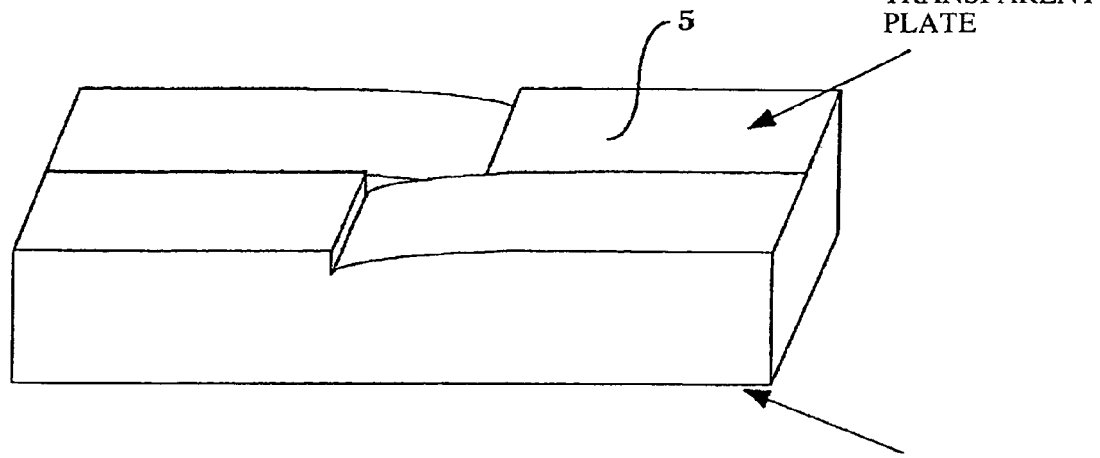
BOTTOM SURFACE OF TRANSPARENT PLATE
TOP SURFACE OF TRANSPARENT PLATE
FIG.8
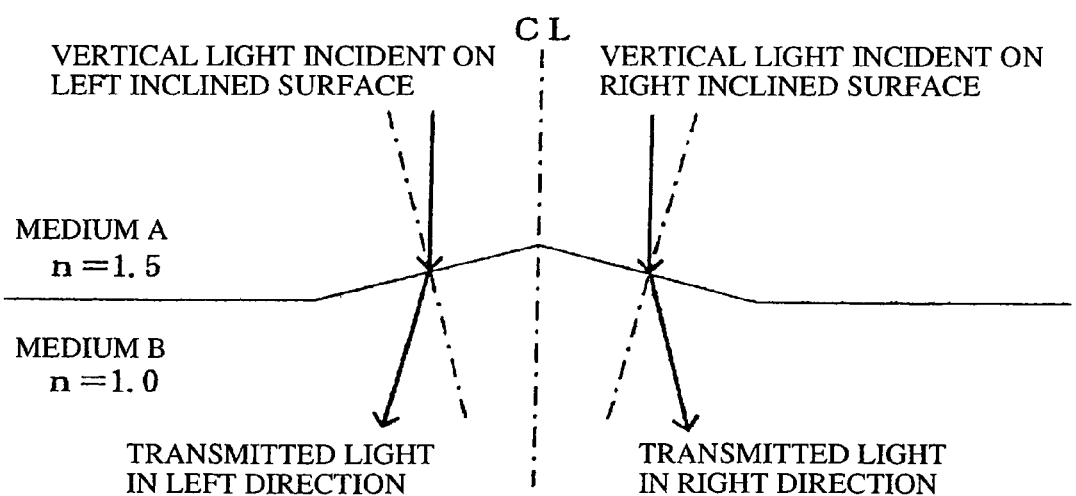
CL
VERTICAL LIGHT INCIDENT ON LEFT INCLINED SURFACE
VERTICAL LIGHT INCIDENT ON RIGHT INCLINED SURFACE
MEDIUM A
n=1.5
MEDIUM B
n=1.0
TRANSMITTED LIGHT IN LEFT DIRECTION
TRANSMITTED LIGHT IN RIGHT DIRECTION

FRONT SIDE LIGHT   BACK SIDE LIGHT

FIG.12
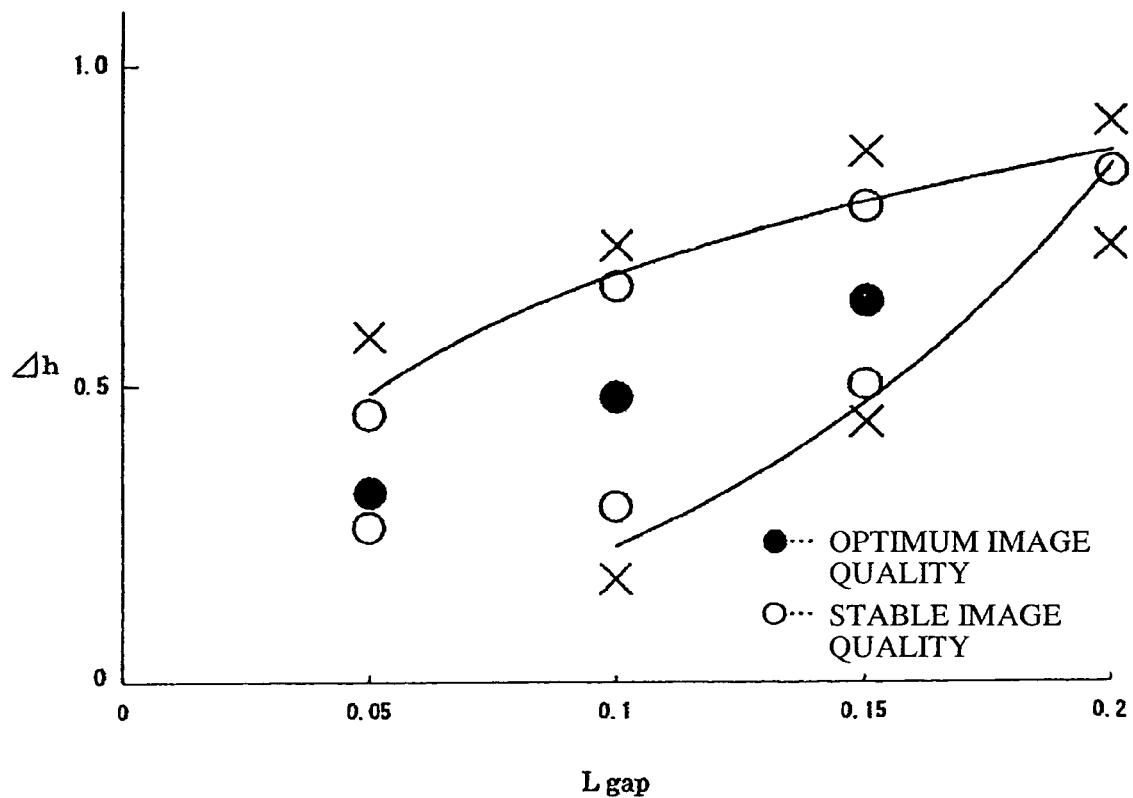
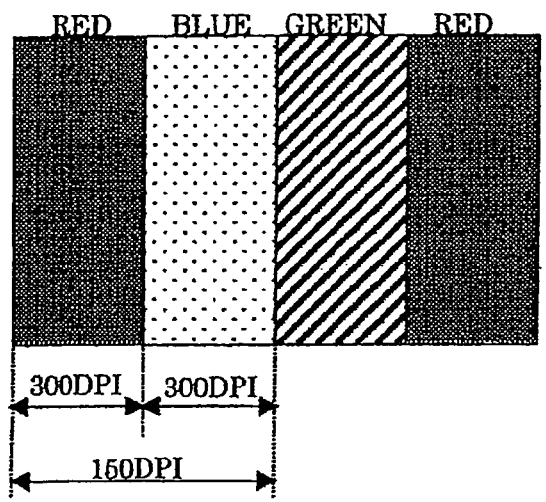

BOTTOM SURFACE OF TRANSPARENT PLATE

TOP SURFACE OF TRANSPARENT PLATE

VERTICAL LIGHT INCIDENT ON LEFT INCLINED SURFACE
VERTICAL LIGHT INCIDENT ON RIGHT INCLINED SURFACE

MEDIUM A
n = 1.5

MEDIUM B
n = 1.0

TRANSMITTED LIGHT IN LEFT DIRECTION
TRANSMITTED LIGHT IN RIGHT DIRECTION

BACK SIDE LIGHT
FRONT SIDE LIGHT

FIG.18
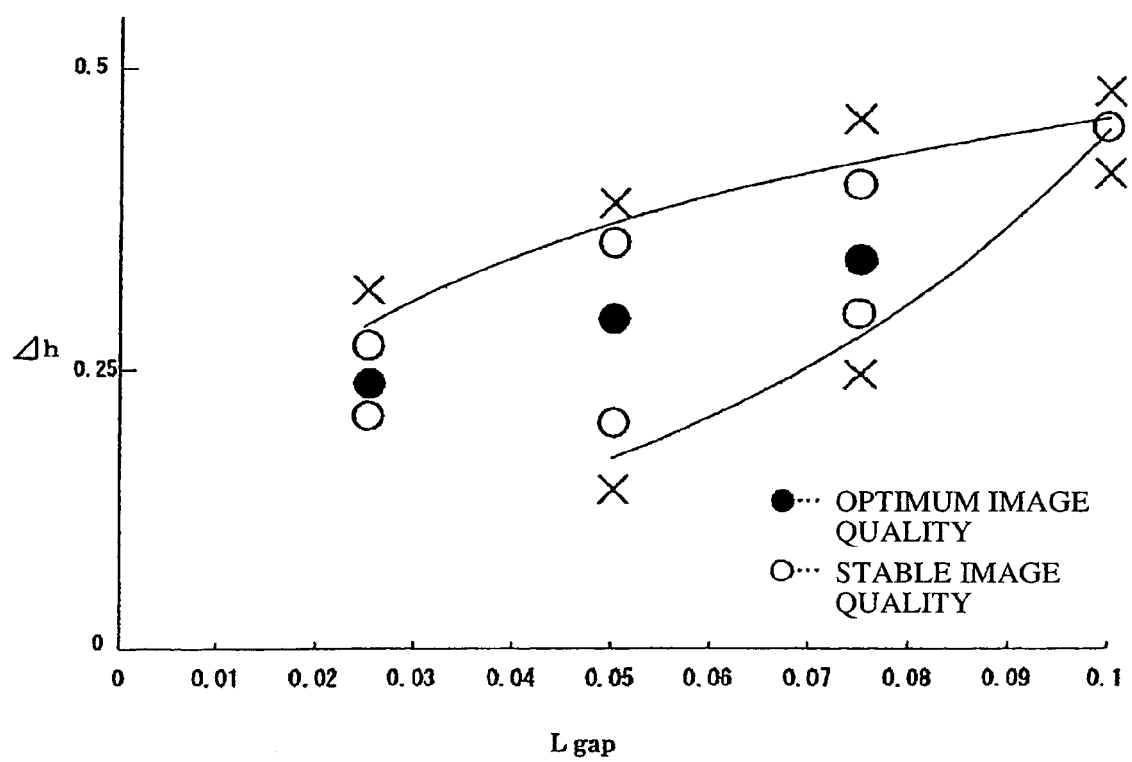
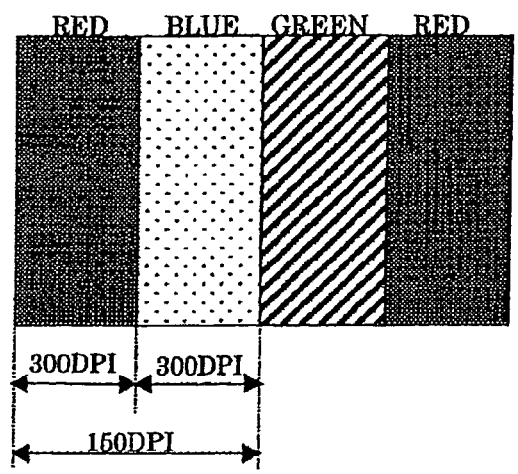

IMAGE SENSOR

BACKGROUND OF THE INVENTION

1. Field of the Invention

The present invention relates to an image sensor used for an image input device and in particular, to a contact type image sensor in which a plurality of semiconductor chips are mounted as a photoelectric conversion element.

2. Description of the Related Art

As one structure of an image sensor, an image reading device is disclosed in FIG. 9 in patent document 1, in which a plurality of chips are arranged with prevention for a density difference caused by a pitch error between the chips (at a boundary of the chips) from becoming conspicuous. In the drawing, reference symbols C1 and C2 denote chips (photoelectric conversion elements), Ca and Cb denote chip ends adjacent to each other, La denotes a gap distance between the ends of adjacent chips. Further, a reference symbol r denotes an image pickup element (light receiving element), P denotes a distance between the image pickup elements, P' denotes a distance between boundary image pickup elements. Still further, in FIG. 3(c) in patent document 1, reference symbols C14 and C21 are image pickup elements located at the boundary of the chips adjacent to each other.

Moreover, in FIG. 4 in patent document 2 is disclosed an image reading device in which a plurality of optical element chips are arranged. In the drawing, a reference symbol 1 denotes an optical element chip, 2 denotes an image pickup element (light receiving element), 3 denotes an (inclined) end surface in a longitudinal direction, 3a denotes an edge on the obverse side of the chip 1, 3b denotes an edge on the reverse side (substrate side) of the chip 1, 7 denotes a substrate, and 8 denotes silver paste.

[Patent document 1] Japanese Unexamined Patent Publication No. 2003-101724

[Patent document 2] Japanese Unexamined Patent Publication No. 6-218985

In an image sensor having a plurality of chips arranged on a substrate, a distance P' between boundary image pickup elements become longer with respect to a distance P between image pickup elements and hence in patent document 1 an average value of the output of image pickup element C14 and the output of image pickup element C21 is added as interpolation data. Because it is not actual image data which is read by the image sensor, it means that simulation (pseudo) data is produced.

At this point, in patent document 2, the rigidity of a rotating blade is enhanced and dicing is performed while inclining the rotating blade and the edge 3a on the obverse side of chip 1 is made protruded to retract the edge 3b on the reverse side, so that the distance P' between the boundary image pickup elements can be brought close to the actual distance P between the image pickup elements on the same chip.

However, at a time of actual production with automatic mounting by a die bonder or the like, the chips need to be previously separated and mounted in consideration of the collision (contact) of chips caused by a mounting accuracy. Moreover, even if the chips can be mounted with high accuracy in themselves, the chips are mechanically mounted on an adhesive such as silver paste 8 located below, so that the chips might be changed in positions after they are mounted.

Further, at the time of bonding the chips, the adhesive is thermally cured to fix the chips. Hence, there is presented a problem that in the case of arranging many chips, after all, the chips can not be mounted with high accuracy because the position changes of chips caused by the random movement of chips due to the shrinkage of adhesive at the time of curing, can not be neglected.

SUMAMRY OF THE INVENTION

An image sensor according to the present invention solves the problems described above and the object of the present invention is to provide an image sensor that can read an image in a boundary region of chips with high fidelity without using interpolation data (data by an imaginary image pickup element) even if a distance P' between boundary image pickup elements is larger than a distance P between image pickup elements on the same chip.

An image sensor in accordance with the present invention is characterized to include: a light source that applies light to an object to be picked image up; a lens that extends in a direction perpendicular to a direction in which the object to be picked image up is moved and converges reflected light from the object to be picked image up over a predetermined reading width; a sensor substrate on that a large number of semiconductor chips each of which has a plurality of image pickup elements are linearly arranged to receive the reflected light converged by the lens; a transparent plate that is interposed between the lens and the sensor substrate and has at least one of cutout portions and protruding portions formed near a gap between the adjacent semiconductor chips; and a case that accommodates or holds at least the lens, the sensor substrate, and the transparent plate.

As a result, the image sensor in accordance with the present invention can read an image in the boundary region with high fidelity without using the interpolation data (data by an imaginary pickup device) even if the distance between boundary image pickup elements is larger than the distance between image pickup elements on the same chip.

BRIEF DESCRIPTION OF THE DRAWINGS

FIG. 1 is a cross sectional view to show a structure of image sensor in accordance with Embodiment 1 of the present invention.

FIG. 2 is a diagram to show the positional relationship of rod lens array, transparent plate, and sensor substrate of the image sensor in accordance with Embodiment 1 of the present invention.

FIG. 6 is a diagram to show the sectional shape of bottom surface of the transparent plate in accordance with Embodiment 1 of the present invention.

FIG. 7 is a partial perspective view of the transparent plate in accordance with Embodiment 1 of the present invention.

FIG. 8 is a diagram to explain the refraction of light at the boundary of medium.

FIG. 12 is a diagram to show the optimum image quality region of the image sensor in accordance with Embodiment 1 of the present invention.

FIG. 18 is a diagram to show the optimum image quality region of an image sensor in accordance with Embodiment 5 of the present invention.

DETAILED DESCRIPTION OF THE PREFERRED EMBODIMENTS

Embodiment 1

Figure 3:
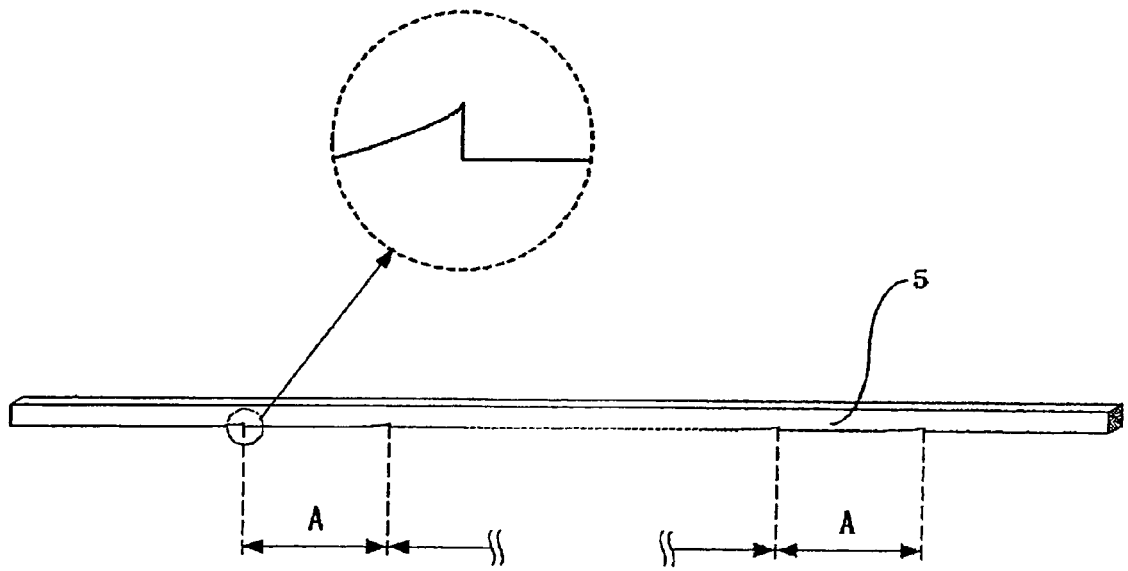
FIG. 3 is a diagram to show a position and schematic shape of cutout portion of a transparent plate in accordance with Embodiment 1 of the present invention.

Hereafter, Embodiment 1 of the present invention will be described. FIG. 1 is a cross sectional view to show a structure of image sensor in accordance with Embodiment 1 of the present invention. In FIG. 1, a reference numeral 1 denotes a light source for applying light to an object to be picked image up (original document, paper money, check, marketable securities and the like), 2 denotes a glass plate for providing a running plane over which the object 3 to be picked image up runs or for protecting and hermetically closing the image sensor, 3 denotes an original document that is the object to be picked image up, 4 denotes a lens (rod lens array) for converging light reflected by the original document 3, 5 denotes a transparent plate for transmitting reflected light, 6 denotes a semiconductor chip composed of an image pickup element and its drive circuit, 7 denotes a sensor substrate on which the semiconductor chip 6 are mounted, 8 denotes a connector for passing and receiving an input/output signal, 9 denotes a case for accommodating or holding the rod lens array 4, the transparent plate 5, and the sensor substrate 7, and 10 denotes a drive platen for driving the original document 3 and the drive platen 10 is not usually mounted on the image sensor.

Next, operation will be described. In FIG. 1, light from the light source 1 is applied to the original document 3 via the glass plate 2. A part of light reflected and scattered by the original document 3 becomes reflected light and is converged by the rod lens array 4 via the glass plate 2. The reflected light converged by the rod lens array 4 transmits through the transparent plate 5 and incidents to the image pickup element (light receiving element) of the semiconductor chip 6 on the sensor substrate 7.

A distance between the surface of original document and the image pickup element placed on the top surface of the semiconductor chip is called a light path length, and a part of light which is reflected and scattered, and incident along this light path is received as reflected light by the semiconductor chip 6. The rod lens array 4, the transparent plate 5 and the part of image pickup element of the semiconductor chip 6 are arranged symmetrically with respect to a light path axis.

Figure 4:
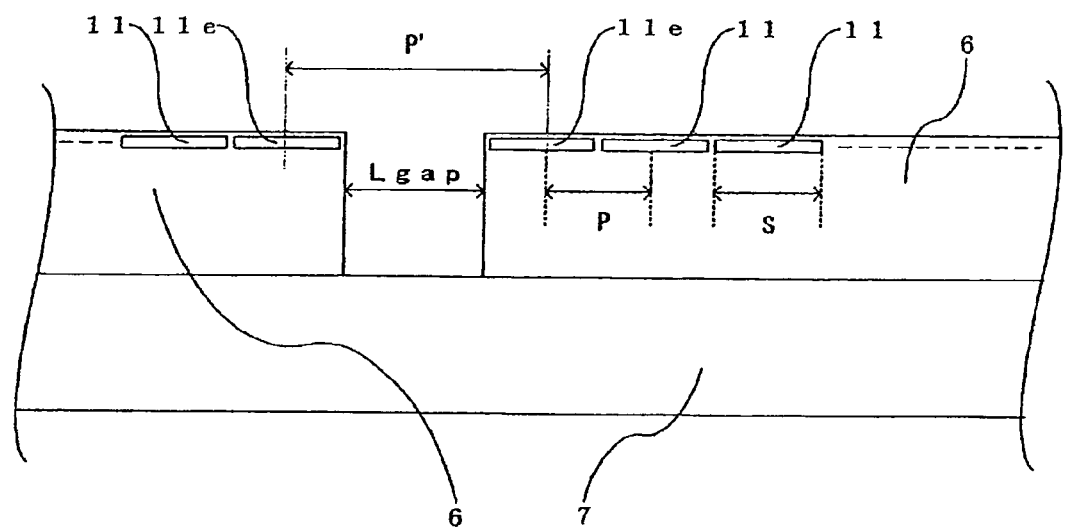
FIG. 4 is a diagram to show the positional relationship of semiconductor chip on the sensor substrate of the image sensor in accordance with Embodiment 1 of the present invention.

FIG. 2 is an perspective view (bird's eye view) to show the positional relationship among the rod lens array 4, the transparent plate 5, and the semiconductor chip 6 on the sensor substrate 7 and their shapes in a longitudinal direction (direction in which the original document is read). At this point, a reference numeral 11 denotes an image pickup element which is formed on the semiconductor chip 6. FIG. 3 shows a cutout portion which is formed on the bottom surface of transparent plate 5 and the pitch (A) of this cutout portion agrees with the mounting pitch of semiconductor chip 6. FIG. 4 shows the positional relationship between the adjacent semiconductor ships 6 on the sensor substrate 7. In FIG. 4, a reference symbol P denotes a distance between image pickup elements, P' denotes a distance between boundary image pickup elements, S denotes a size of light receiving region of the image pickup element 11, the region is square or rectangular, Lgap denotes a gap distance between the adjacent semiconductor chips (gap between semiconductor chips 6), and 11e denotes image pickup elements located at both ends of semiconductor chips 6 (boundary image pickup elements).

Figure 5:
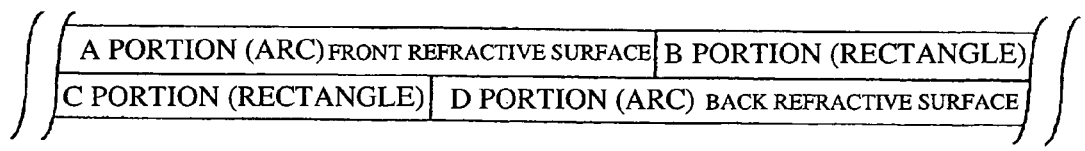
FIG. 5 is a plan view to show the shape of bottom surface of the transparent plate in accordance with Embodiment 1 of the present invention.

FIG. 5 is a plan view to show the shape of cutout portion formed on the bottom surface of transparent plate 5. In a longitudinal direction of the transparent plate 5, the transparent plate 5 includes a surface structured with an arc-shaped, which is named as A portion and a rectangular, which is named as B portion on one side in a direction in which the object 3 to be picked image up is moved and a surface structured with a rectangular, which is named as C portion and an arc-shaped, which is named as D portion on the other side in a direction in which the object 3 to be picked image up is moved. FIG. 6 shows the sectional shape of the A portion and the B portion and the sectional shape of the C portion and the D portion in FIG. 5. FIG. 7 is an perspective view (bird's eye view) of the cutout portion of transparent plate 5.

Figure 9:
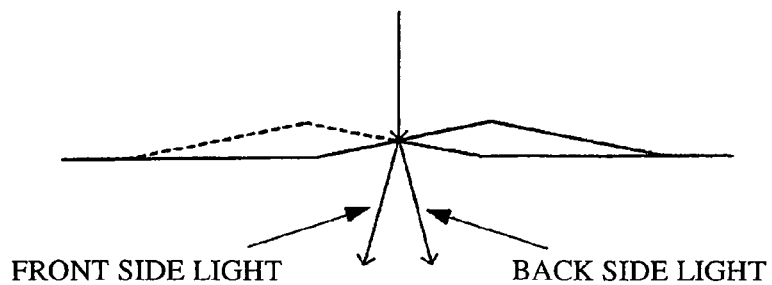
FIG. 9 is a diagram to explain the structural principle of the transparent plate in accordance with Embodiment 1 of the present invention.

In general, in a case where the refractive index of medium A is larger than that of medium B, as shown in FIG. 8, light which incidents not vertically to a surface of the medium B from the medium A is refracted and bent at the boundary between the medium A and the medium B. If the boundary between the medium A (refractive index n=1.5) and the medium B (refractive index n=1.0) is inclined right-side up with respect to a horizontal line of the surface of paper, the refracted light is bent in a left direction with respect to the incident light. If the boundary between the medium A and the medium B is inclined right-side down, the refracted light is bent in a right direction with respect to the incident light. FIG. 9 is a diagram in which the boundaries between the medium A and the medium B shown in FIG. 8 are overlaid on each other with one on the front side of surface of paper and the other on the back side. In this case, the refracted light appears as front side light and back side light with respect to the incident vertical light.

Figure 10:
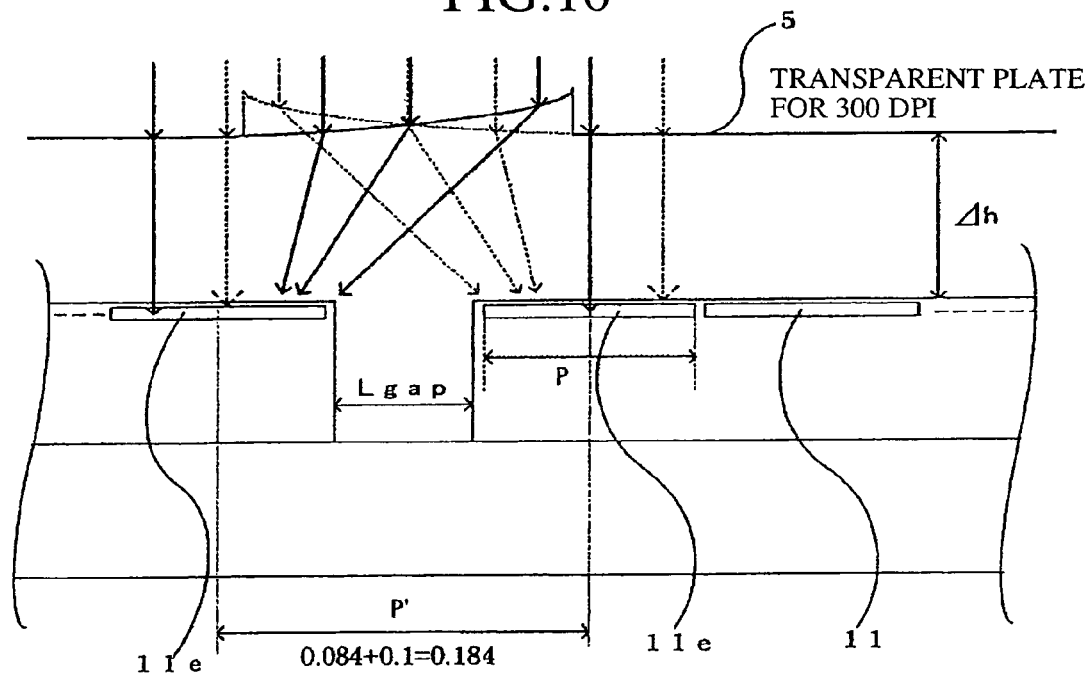
FIG. 10 is a diagram to show a light path to the sensor substrate of the image sensor in accordance with Embodiment 1 of the present invention.

FIG. 10 is a diagram to show the directions of refracted light from the front refractive surface and the back refractive surface shown in FIG. 5 and FIG. 6 to the sensor substrate 7. In this case, the vertical light incident on the boundary region between semiconductor chips 6 is refracted and incident dividedly to the directions of image pickup elements (boundary image pickup elements) 11e located at the boundary.

Figure 11:
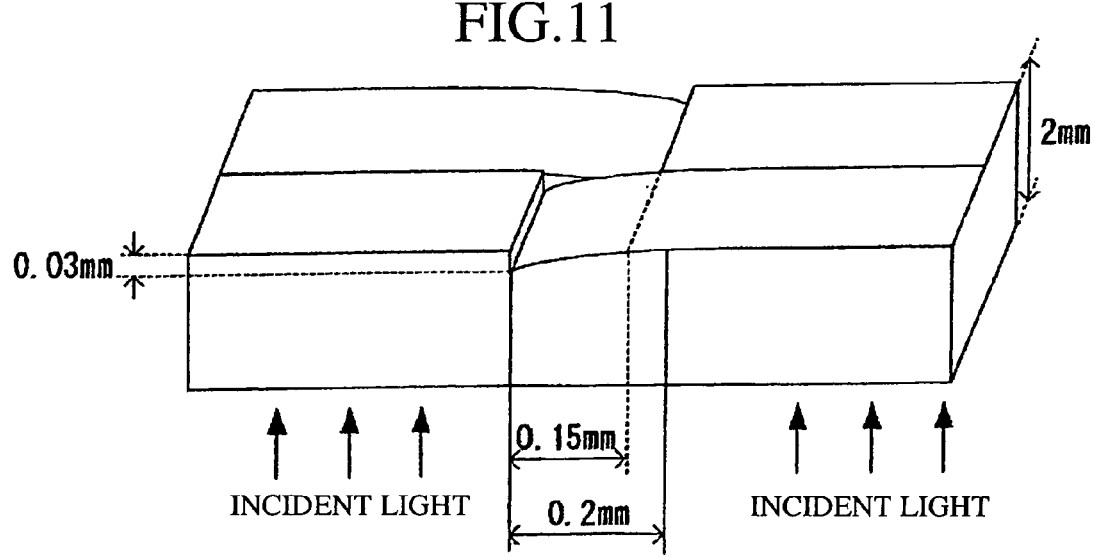
FIG. 11 is a partial enlarged perspective view to show the specific structure of the transparent plate in accordance with Embodiment 1 of the present invention.

FIG. 11 shows a specific dimensions of region of transparent plate 5 corresponding to the vertical light which incidents on the boundary region between semiconductor chips 6. In this Embodiment is shown the transparent plate 5 that uses acrylic resin as transparent plastic material and has a cutout portion that is formed into a curved surface and cut in such a way as to have a width of 0.2 mm and a height of 0.03 mm. At this point, the transparent plate 5 may be formed by grinding a transparent glass material.

FIG. 12 shows data obtained by conducting a test of reproductivity of an image on an image sensor having a reading density of 300 DPI in which the transparent plate 5 having the cutout portion shown in FIG. 11 is mounted. The test was conducted by use of a stripe pattern made by printing the colors of red, blue, and green at a density of 300 DPI and the reproductivity of an image corresponding to the boundary region between semiconductor chips 6 was evaluated. Since the accuracy of image varies according to a parameter based on the gap distance (Lgap) between chips caused by the mounting positions of semiconductor chips 6 and a parameter based on the distance (+delta h) between the bottom surface of transparent plate 5 and the image pickup element 11, measurement and evaluation were performed in consideration of these parameters. It is clearly shown by FIG. 12 that even if Lgap is 0.2 mm, an excellent image quality can be secured by changing the distance +delta h.

Embodiment 2

Figure 13:
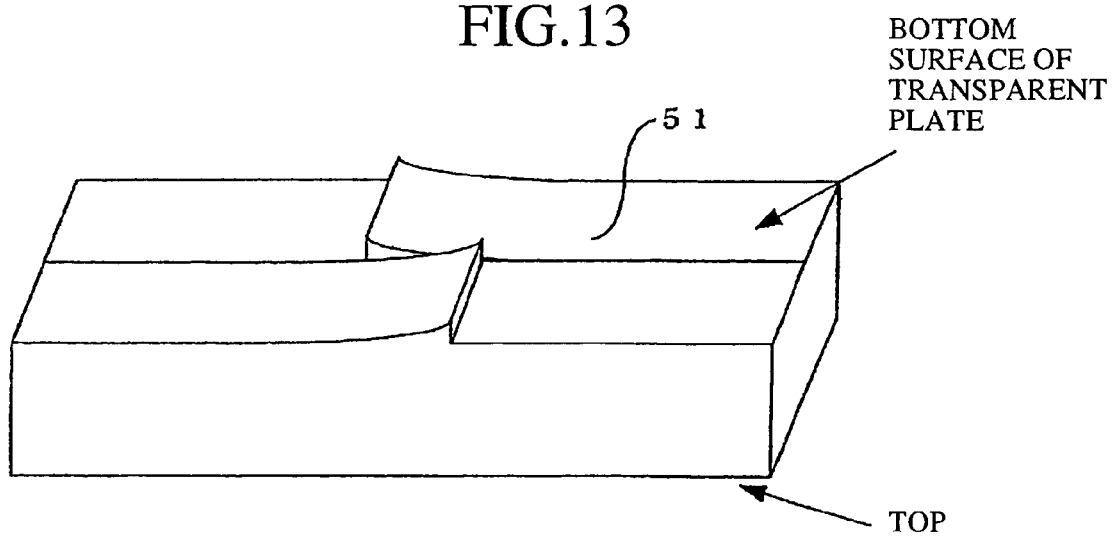
FIG. 13 is a partial perspective view of a transparent plate in accordance with Embodiment 2 of the present invention.
Figure 14:
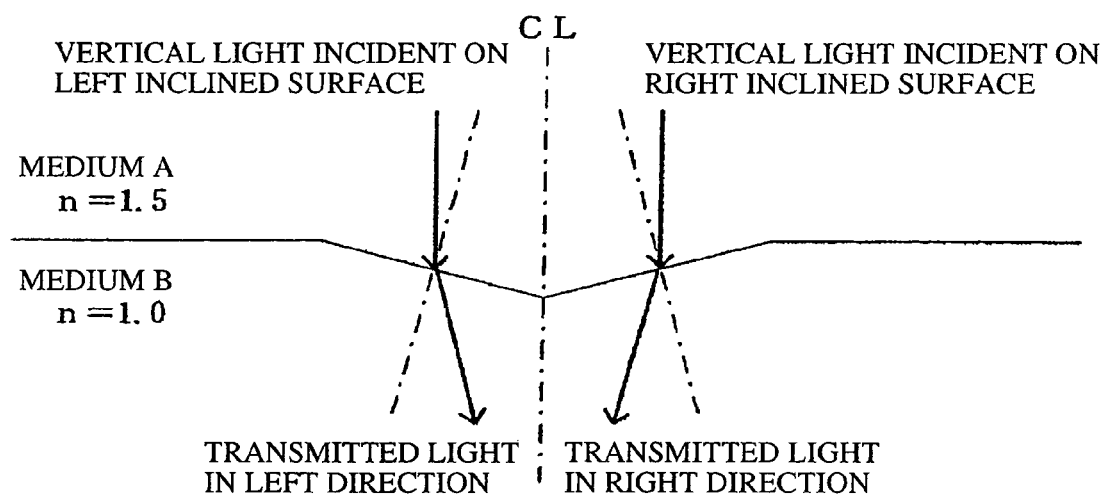
FIG. 14 is a diagram to explain the refraction of light at the protruding and inclined boundary of medium.
Figure 15:
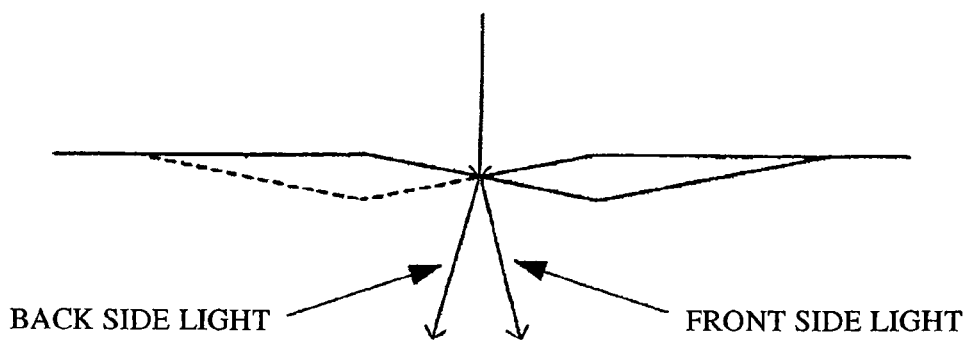
FIG. 15 is a diagram to explain the structural principle of the transparent plate in accordance with Embodiment 2 of the present invention.

FIG. 13 shows a transparent plate 51 that is formed to have a protruding portion in place of the cutout portion shown in FIG. 7, as described in Embodiment 1. The protruding portion of this transparent plate 51 will be described with reference to FIG. 14 and FIG. 15 in contrast with FIG. 8 and FIG. 9. If the boundary portion between the medium A and the medium B is inclined right-side down in FIG. 14, the refracted light is bent in the right direction with respect to the incident light. If the boundary portion between the medium A and the medium B is inclined right-side up, the refracted light is bent in the left direction with respect to the incident light. FIG. 15 is a diagram in which the boundaries between the medium A and the medium B in FIG. 15 are overlaid on each other with one on the front side of surface of paper and the other on the back side. In this case, light bent in the right direction of the refracted light relative to the incident vertical light becomes front side light and light bent in the left direction of the refracted light relative to the incident vertical light becomes back side light. The directions of refracted lights shown in Embodiment 2 and the directions of refracted lights shown in FIG. 8 and FIG. 9 of Embodiment 1 are opposite to each other. That is, a situation of the distribution of light is the same even if the transparent plate 5 formed in the shape of cutout portion is used for the boundary region of semiconductor chips 6 or the transparent plate 51 formed in the protruding portion is used.

Embodiment 3

Figure 16:
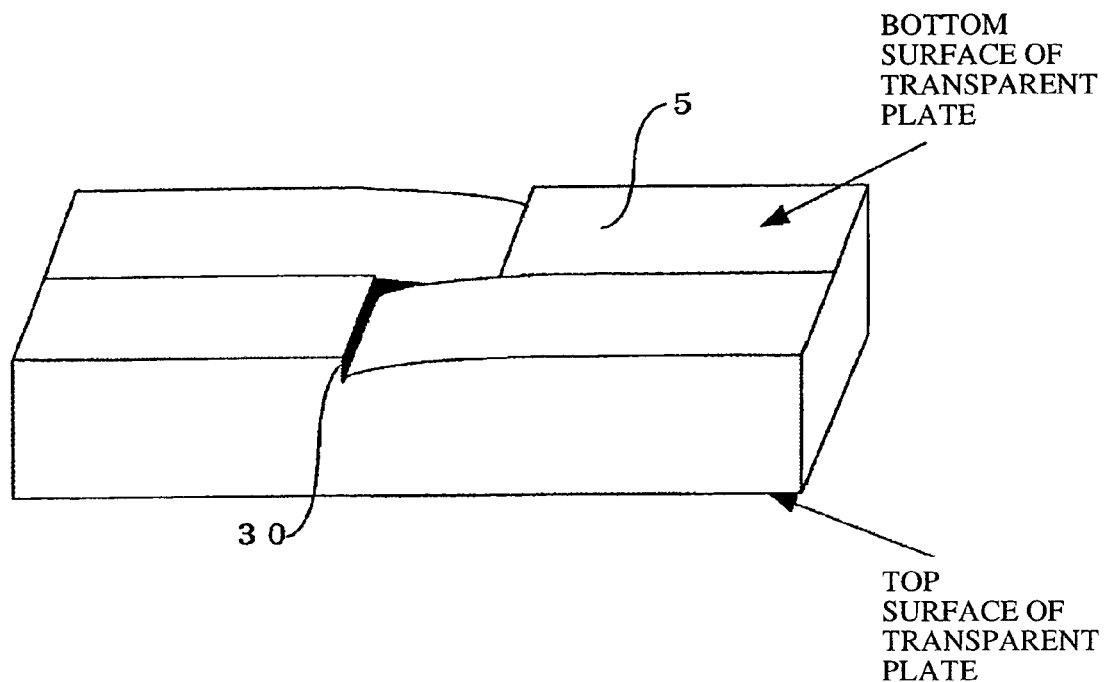
FIG. 16 is a partial perspective view of a transparent plate in accordance with Embodiment 3 of the present invention.

FIG. 16 is a partial perspective view to show a transparent plate 5 in which the discontinuous region of the transparent plate 5 of image sensor shown in FIG. 7 in Embodiment 1 of the present invention is achieved a light intercepting treatment. In Embodiment 1 and Embodiment 2, the vertical light which incidents on the boundary region between semiconductor chips 6 has been mainly described. However, in actual because there is such reflected effective light from the original document 3 that is slightly inclined with respect to the vertical light and when the transparent plate 5 has the cutout portion of 0.03 mm in height (h) with respect to its thickness (2 mm), a part of the effective light is totally reflected and enters into the other image pickup element 11, thereby to reduce the definition of a read image. In order to prevent this phenomenon, the stepped portion and the inclined portion that are also discontinuous regions located on a plane parallel to the light path axis are coated with a black ink for a commercially available solder resister as a light intercepting portion 30 and the light intercepting portion 30 is appropriately dried and solidified.

Embodiment 4

Figure 17:
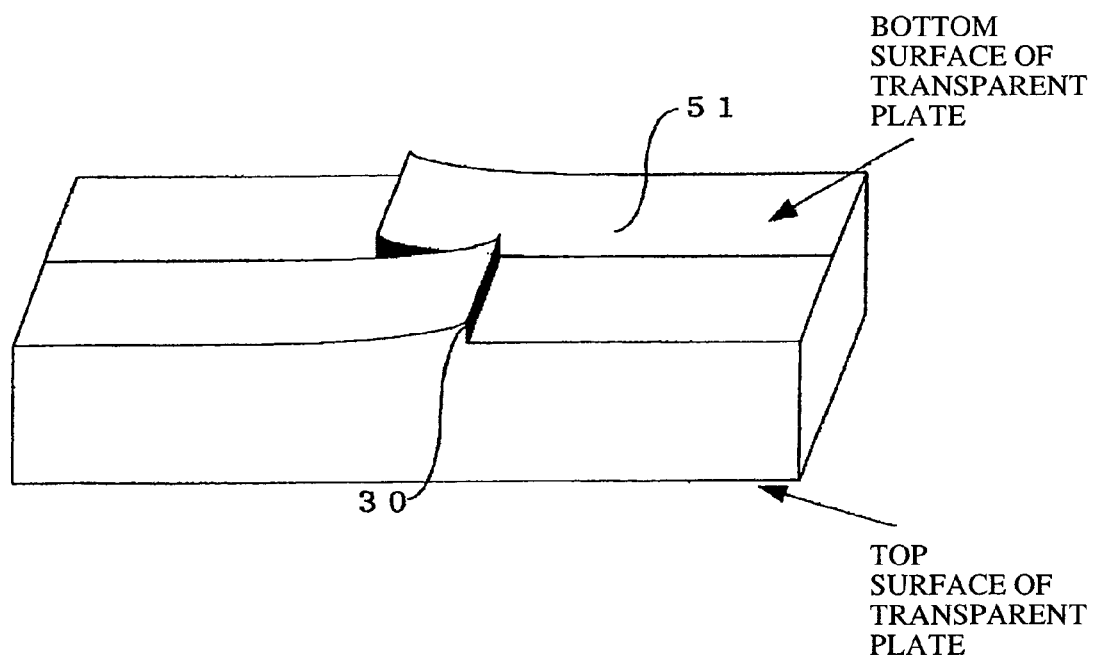
FIG. 17 is a partial perspective view of a transparent plate in accordance with Embodiment 4 of the present invention.

FIG. 17 is a partial perspective view to show a transparent plate 51 in which the discontinuous region of the transparent plate 51 of image sensor shown in FIG. 13 in Embodiment 2 of the present invention is achieved a light intercepting treatment. In actual because there is such reflected effective light from the original document 3 that is slightly inclined with respect to the vertical light and when the transparent plate 51 has the protruding portion of 0.03 mm in height (h) with respect to its thickness (2 mm), a part of the effective light is totally reflected and enters into the other image pickup element 11, thereby to reduce the definition of a read image. In order to prevent this phenomenon, as is the case with Embodiment 3, the black ink for a commercially available solder resister is used to make the light intercepting portion 30 for the stepped portion and the inclined portion that are also discontinuous regions located on the plane parallel to the light path axis.

Embodiment 5

FIG. 18 shows data obtained by conducting a test of reproductivity of an image by use of an image sensor having a density of 600 DPI in place of the image sensor having a density of 300 DPI shown in Embodiment 1 of the present invention in which the transparent plate 5 having the cutout portion shown in FIG. 11 is mounted. The test, as is the case with Embodiment 1, was conducted by use of a stripe pattern made by printing the colors of red, blue, and green at a density of 300 DPI and the reproductivity of an image at the boundary portion between semiconductor chips 6 was evaluated. It is clearly shown by FIG. 18 that even if Lgap is 0.1 mm, an excellent image quality can be secured by changing the distance +delta h. At this point, while the transparent plate 5 structured with the cutout portion has been described in this Embodiment, the use of the transparent plate 51 structured with the protruding portion in place of the cutout portion can also provide the same test results.

Moreover, when the light intercepting portion 30 is used for the discontinuous region of the cutout portion of transparent plate 5 or the protruding portion of transparent plate 51, the image sensor mainly receives the vertical light from the original document, so that the image sensor having a density of 600 DPI can further improve the clearness of image quality (a density difference at an image boundary) in addition to definition.

Embodiment 6

Figure 19:
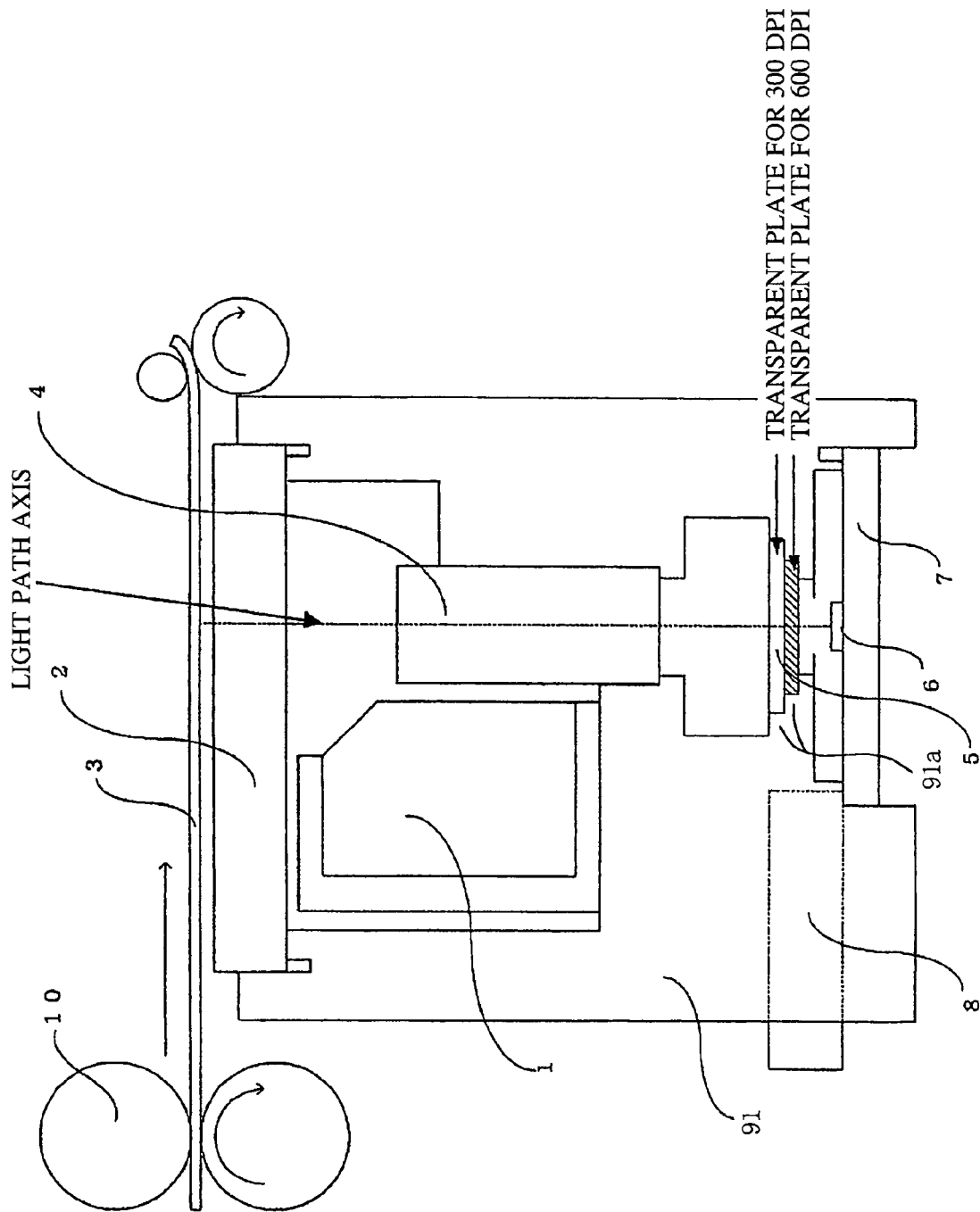
FIG. 19 is a cross sectional view to show a structure of image sensor in accordance with Embodiment 6 of the present invention.

FIG. 19 show a cross sectional view of an image sensor using a case 91 on which the position of the transparent plate 5 or the transparent plate 51 is assembled in (placed in) the light path axis of the case 9 of the image sensor, can be stepwise changed by depressions 91a, the transparent plate 5 or the transparent plate 51 is shown in Embodiments 1 to 5 of the present invention. The individual semiconductor chip 6 mounted on the image sensor has a size of about 12.8 mm or less in a direction of reading even if the semiconductor chip has a resolution of 600 DPI or 300 DPI and one semiconductor chip 6 has 144 image pickup elements (the gap between the image pickup elements is about 0.084 mm) in the case of 300 DPI and 288 image pickup elements (the gap between the image pickup elements is about 0.042 mm) in the case of 600 DPI. Hence, even if the resolution is different, the gap (interval) between the adjacent semiconductor chips 6 is the same as the manufacturing process at the time of mounting.

Therefore, in this Embodiment, a sensor substrate 7 for 600 DPI and a sensor substrate 7 for 300 DPI are identical with each other in form and mounting position, but the position of transparent plate which is inserted in the light path axis is required to be changed, so that the transparent plate is changed in size in a direction of width and is inserted into the case 91 having the stepwise depressions (91a) in order to hold the transparent plates which are different in size, whereby even the sensor substrate 7 for 300 DPI and the sensor substrate 7 for 600 DPI can be easily assembled. Hence, the case 91 can be commonly used for the sensor substrate 7 for 300 DPI and the sensor substrate 7 for 600 DPI, which produces an effect capable of securing also a reading quality of high accuracy.

Figure 20:
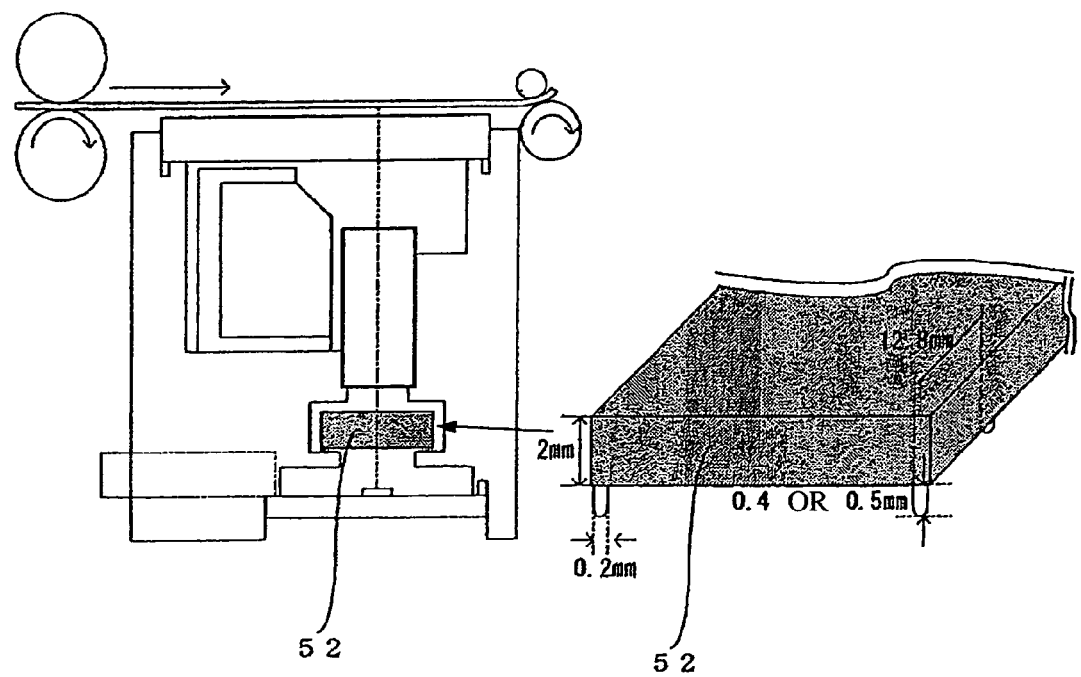
FIG. 20 is another cross sectional view to show the structure of image sensor in accordance with Embodiment 6 of the present invention.

Moreover, in place of the depressions 91a of the case 91, a plurality of projections that are about 0.2 mm in diameter and are different in height between the image sensor of 600 DPI and the image sensor of 300 DPI are respectively formed on the transparent plate along a direction of reading in positions outside the incident region of reflected light incident on the transparent plate and holes in which the projections are fitted, are formed in predetermined positions of the case 9. This can also produce the same effect. That is, as shown in FIG. 20, the proper use of the transparent plate 52 for 600 DPI which has lower projections and the transparent plate 52 for 300 DPI which has higher projections makes it possible to change the distance between the transparent plate 52 and the sensor substrate 7. In this regard, while the transparent 5 or the transparent 51 is fixed to the case 9 by an adhesive in the case 91 provided with the depressions 91a, the transparent plate 52 provided with the projections is fixed to the case 9 by interlocking the projections into the holes.

Incidentally, in this Embodiment, means for changing the distance between the transparent plate and the sensor substrate has been described for the case where the specifications of resolution of the image sensor are different. However, a color image sensor mounted with an infrared light source and an ultraviolet light source in addition to light sources of red, green, and blue is used for a purpose of discriminating paper money or the like, so that the means may be used also for the adjustment of a difference in conjugate length of the image sensor caused by the difference in wavelength between the respective lights.

Embodiment 7

In Embodiments 1 to 6, a pair of the cutout portions (FIG. 7) or a pair of protruding portions (FIG. 13) of the transparent plate are formed in pairs separately at two positions of front side and back side with two part structure on the surface parallel to the direction in which the original document is carried, but even if the cutout portions or the protruding portions are formed separately in more positions, such as two pairs of cutout portions or two pairs of protruding portions with four part structure or more, they can produce the same effect.

Figure 21:
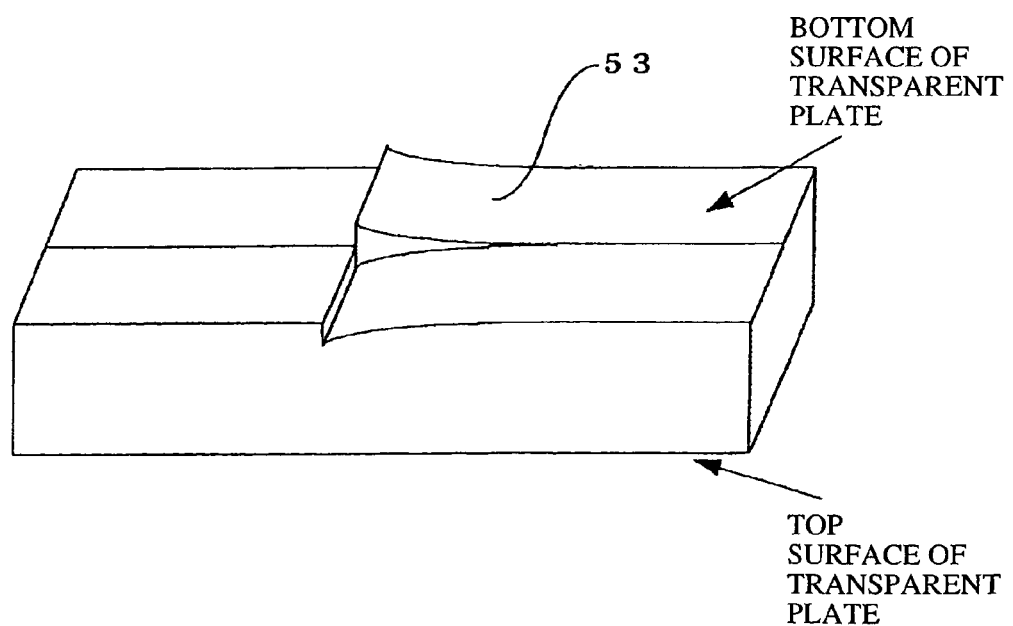
FIG. 21 is a partial perspective view of a transparent plate in accordance with Embodiment 7 of the present invention.

Further, as shown in FIG. 21, the transparent plate 53 having a cutout portion and a protruding portion in combination can converge light in one direction. Therefore, if the cutout portion and the protruding portion are formed in a region near the boundary of one of the semiconductor chips 6 arranged across the gap (Lgap) between the semiconductor chips 6, the light can be converged on the boundary image pickup element 11e of the other semiconductor chip 6.

At this point, in the transparent plate in Embodiments 1 to 7 of the present invention, the cutout portions or the protruding portions are formed on the bottom surface of transparent plate corresponding to the vicinity of planes of the image pickup elements 11 across the gap (Lgap) between the semiconductor chips 6. However, in case when the transparent plate is enough thin, even if the cutout portions or the protruding portions are formed on the top surface of transparent plate, they can be formed near the image pickup element 11 and hence can produce a corresponding effect.

Further, in the image sensor shown in Embodiments 1 to 7 of the present invention, the transparent plate is a molded integrated structure. However, it is also recommended to reduce the thickness of the transparent plate and to arrange the transparent plates only near the Lgap separately.

Still further, in the image sensor shown in Embodiments 1 to 7 of the present invention, the plastic material or the soda glass material which has a refractive index (n) of about 1.5 is used as the transparent plate. However, when refracted light that is made steep and is emitted from a longer distance is applied to a desired boundary image pickup element 11e side, even the use of transparent crystal or quartz which has a refractive index (n) of about 2.0 can produce a corresponding effect.

As described above, in the image sensor shown in Embodiments 1 to 7, there is a large gap between the adjacent semiconductor chips and even if the image pickup element 11 is not existing in this region, the actual light from the original document (for example, paper money) can be received by the boundary image pickup element 11e of the semiconductor chip. Hence, the image sensor can read a high fidelity image output with high accuracy. In addition, since it is not performed that the imaginary image pickup element is interpolated as image data to irregularly increase the number of image pickup elements, signal processing as the image sensor can be easily performed.

What is claimed is:

1. An image sensor comprising:
    a light source that applies light to an object to be picked image up;
    a lens that extends in a direction perpendicular to a direction in which the object to be picked image up is moved and converges reflected light from the object to be picked image up over a predetermined reading width;
    a sensor substrate on that a large number of semiconductor chips each of which has a plurality of image pickup elements are linearly arranged to receive the reflected light converged by the lens;

a transparent plate that is interposed between the lens and the sensor substrate and has at least one of cutout portions and protruding portions formed near a gap between the adjacent semiconductor chips; and a case that accommodates or holds at least the lens, the sensor substrate, and the transparent plate.

2. The image sensor as claimed in claim 1, wherein the transparent plate has at least one of the cutout portions and the protruding portions formed separately on a surface parallel to the direction in which the object to be picked image up is moved.

3. The image sensor as claimed in claim 1, wherein the transparent plate is formed in divided state in which both of the cutout portions and the protruding portions are mixed.

4. The image sensor as claimed in claim 1, wherein the transparent plate has light intercepting portions on its surfaces of the cutout portions and/or the protruding portions which are parallel to the light path axis.

5. An image sensor comprising:

a light source that applies light to an object to be picked image up;

a lens that extends in a direction perpendicular to a direction in which the object to be picked image up is moved and converges reflected light from the object to be picked image up over a predetermined reading width;

a sensor substrate on that a large number of semiconductor chips each of which has a plurality of image pickup elements are linearly arranged to receive the reflected light converged by the lens;

a transparent plate that is interposed between the lens and the sensor substrate and has at least one of cutout portions and protruding portions formed near a gap between the adjacent semiconductor chips; and a case that accommodates or holds at least the lens, the sensor substrate, and the transparent plate in a manner that a distance between the transparent plate and the sensor substrate is variable.

* * * * *